(12) United States Patent
Ziech

(10) Patent No.: US 7,059,215 B1
(45) Date of Patent: Jun. 13, 2006

(54) REAR ASSEMBLY TANDEM AXLE DIFFERENTIAL CARRIER

(75) Inventor: James Ziech, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/618,991

(22) Filed: Jul. 14, 2003

(51) Int. Cl.
*F16H 48/12* (2006.01)
*F16H 57/02* (2006.01)
*F16H 57/04* (2006.01)
*B62D 61/10* (2006.01)

(52) U.S. Cl. .................... 74/650; 74/606 R; 180/24.11

(58) Field of Classification Search ................... 74/650, 74/606 R, 607; 180/24.09, 24.1, 24.11; 475/221, 475/206, 230
See application file for complete search history.

(56) References Cited

U.S. PATENT DOCUMENTS

| | | |
|---|---|---|
| 2,064,262 A | 12/1936 | Keese |
| 2,693,244 A | 11/1954 | Rockwell et al. |
| 3,029,888 A | 4/1962 | Tapp |
| 3,324,965 A | 6/1967 | Koch et al. |
| 3,618,711 A * | 11/1971 | Vollmer ...................... 184/6.12 |
| 4,754,847 A * | 7/1988 | Glaze et al. ................ 184/6.12 |
| 5,267,489 A | 12/1993 | Ziech |
| 5,295,413 A * | 3/1994 | Sherman .................... 74/606 R |
| 5,860,889 A * | 1/1999 | Schlosser et al. ........... 475/221 |
| 6,425,840 B1 * | 7/2002 | Johansson .................... 475/245 |

FOREIGN PATENT DOCUMENTS

WO    WO 02/099311 A2    12/2002

* cited by examiner

*Primary Examiner*—Tisha Lewis
(74) *Attorney, Agent, or Firm*—Dykema Gossett PLLC

(57) ABSTRACT

A method of assembling a drive axle assembly of a tandem axle assembly is provided. The method includes the step of providing a differential carrier housing having a forward opening and a rear opening. The method further includes inserting several internal components of the drive axle assembly through the rear opening of the carrier housing including input and output gears, a driven gear, a pinion shaft which is rotatably coupled to the driven gear, and a power divider subassembly having a plurality of differential gears. Insertion of these components through the rear opening facilitates the use of a one-piece differential carrier housing with small front openings and maximum structural integrity.

14 Claims, 4 Drawing Sheets

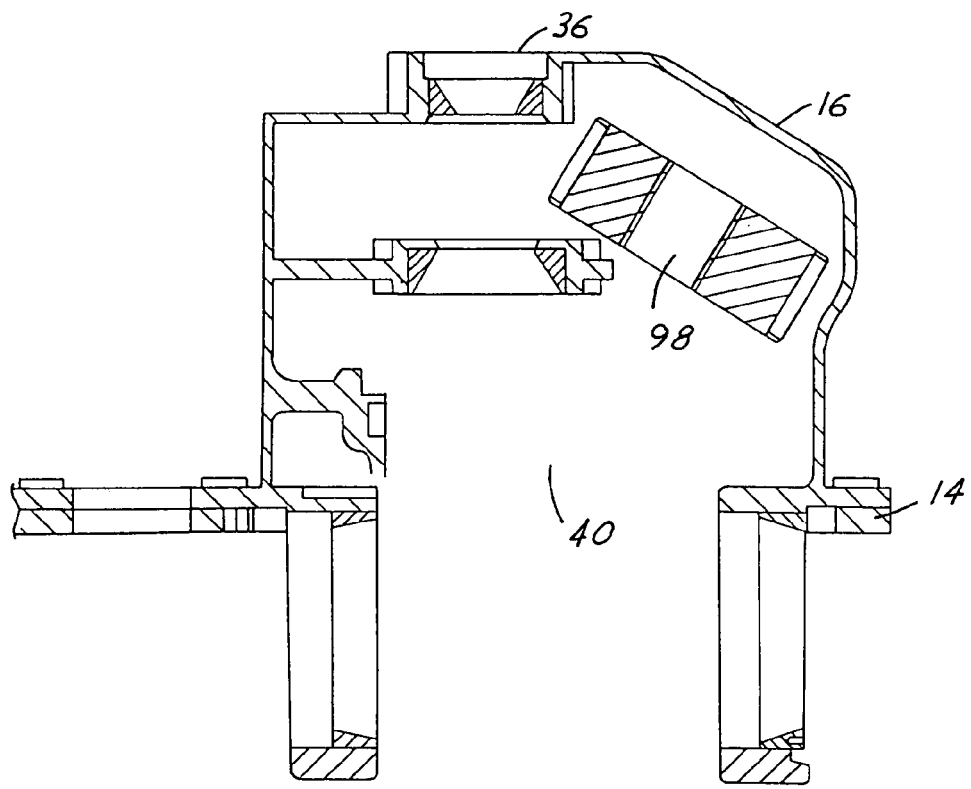
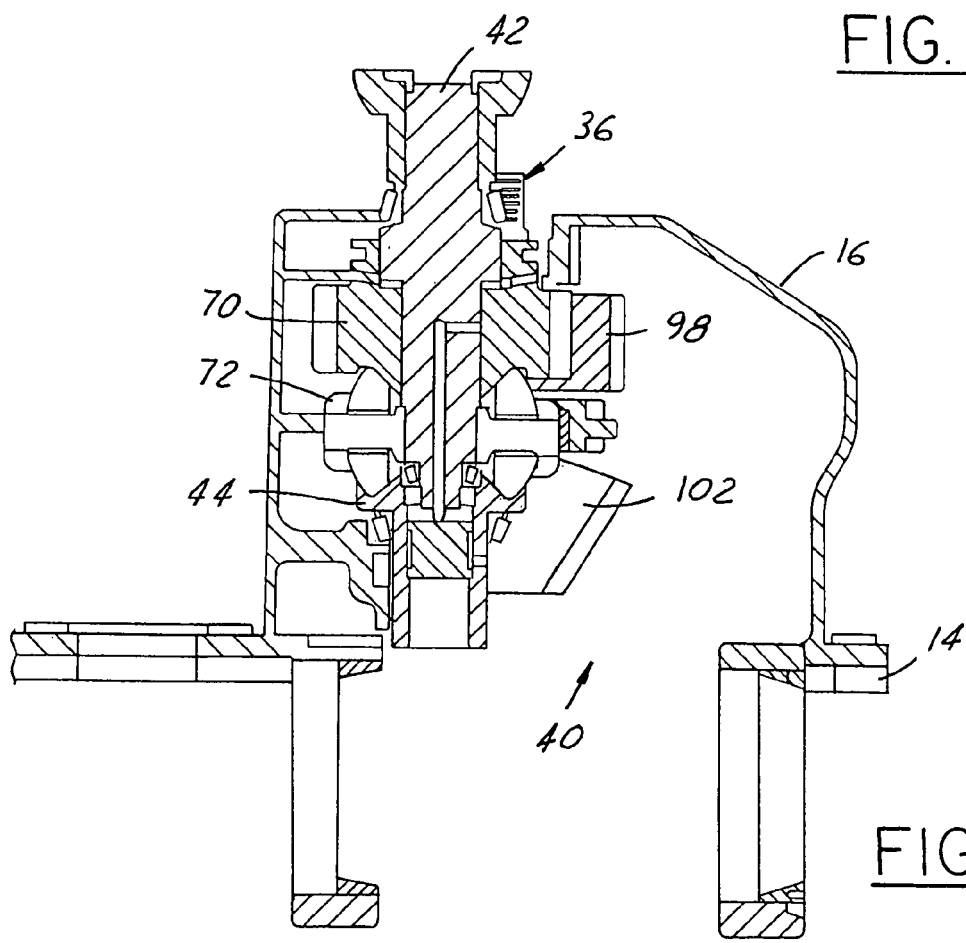
FIG. 4
FIG. 5

REAR ASSEMBLY TANDEM AXLE DIFFERENTIAL CARRIER

BACKGROUND OF THE INVENTION

1. Field of the Invention

This invention relates to drive axle assemblies and, in particular, to a method of assembling a drive axle assembly of a tandem axle assembly.

2. Disclosure of Related Art

A conventional tandem axle assembly includes forward and rear drive axle assemblies. The forward and rear drive axle assemblies each include a pair of axle half shafts extending therefrom on which one or more wheels of a vehicle are mounted. Each of the forward and rear drive axle assemblies further includes a differential gear set that allows the vehicle wheels on each axle assembly to rotate at different speeds. Further, one of the forward and rear drive axle assemblies generally includes means, such as an inter-axle differential, for dividing power between the forward and rear drive axle assemblies.

Conventional drive axle assemblies have a significant disadvantage. The drive axle assembly, housing the inter-axle differential, typically includes at least a differential carrier housing and an axle housing. The carrier housing is typically composed of multiple components that must be coupled together and includes numerous caps or cover pieces to allow assembly and maintenance of internal components. The multiplicity of caps or covers increases the chance of a joint failure and leakage of lubricants. It also increases the cost and weight of the housing, and may compromise the structural integrity of the housing.

The inventors herein have recognized a need for a method of assembling a drive axle assembly that will minimize and/or eliminate one or more of the above-identified deficiencies.

SUMMARY OF THE INVENTION

The present invention provides a method of assembling a drive axle assembly of a tandem axle assembly of a vehicle.

A method of assembly in accordance with the present invention includes providing a differential carrier housing having a forward opening and a rear opening. The method further includes inserting a first gear into the carrier housing through the rear opening and inserting a pinion shaft into the carrier housing through the rear opening, where the pinion shaft is rotatably coupled to the first gear. The method further includes the steps of inserting a second gear into the carrier housing through the rear opening and inserting a power divider subassembly having a plurality of differential gears into the carrier housing through the rear opening. The second gear is placed in mesh with the plurality of differential gears on a rearward side of the power divider subassembly. The method finally includes the step of inserting a third gear into the carrier housing through the rear opening. The third gear is placed in mesh with the plurality of differential gears on a forward side of the power divider subassembly.

A method of assembling a drive axle assembly in accordance with the present invention has significant advantages as compared to conventional drive axle assembly methods. In particular, most of the internal parts of the drive axle assembly are inserted through a single opening at the rear of the carrier housing which facilities the use of a one-piece carrier housing and reduces or eliminates the need for additional openings and associated access covers, thereby reducing the number of bolted joints and the potential for leakage, as well as reducing the manufacturing and assembly time and cost for the drive axle assembly, while improving the structural integrity of the assembly.

These and other features and objects of this invention will become apparent to one skilled in the art from the following detailed description and the accompanying drawings illustrating features of this invention by way of example.

BRIEF DESCRIPTION OF THE DRAWINGS

FIG. 4 is a cross-sectional view of a portion of the drive axle assembly of FIG. 1 illustrating one step in a method of assembling a drive axle assembly in accordance with one embodiment of the present invention.

FIG. 5 is a cross-sectional view of a partially-assembled drive axle assembly assembled in accordance with the inventive method.

DETAILED DESCRIPTION OF THE PREFERRED EMBODIMENT

Figure 1:
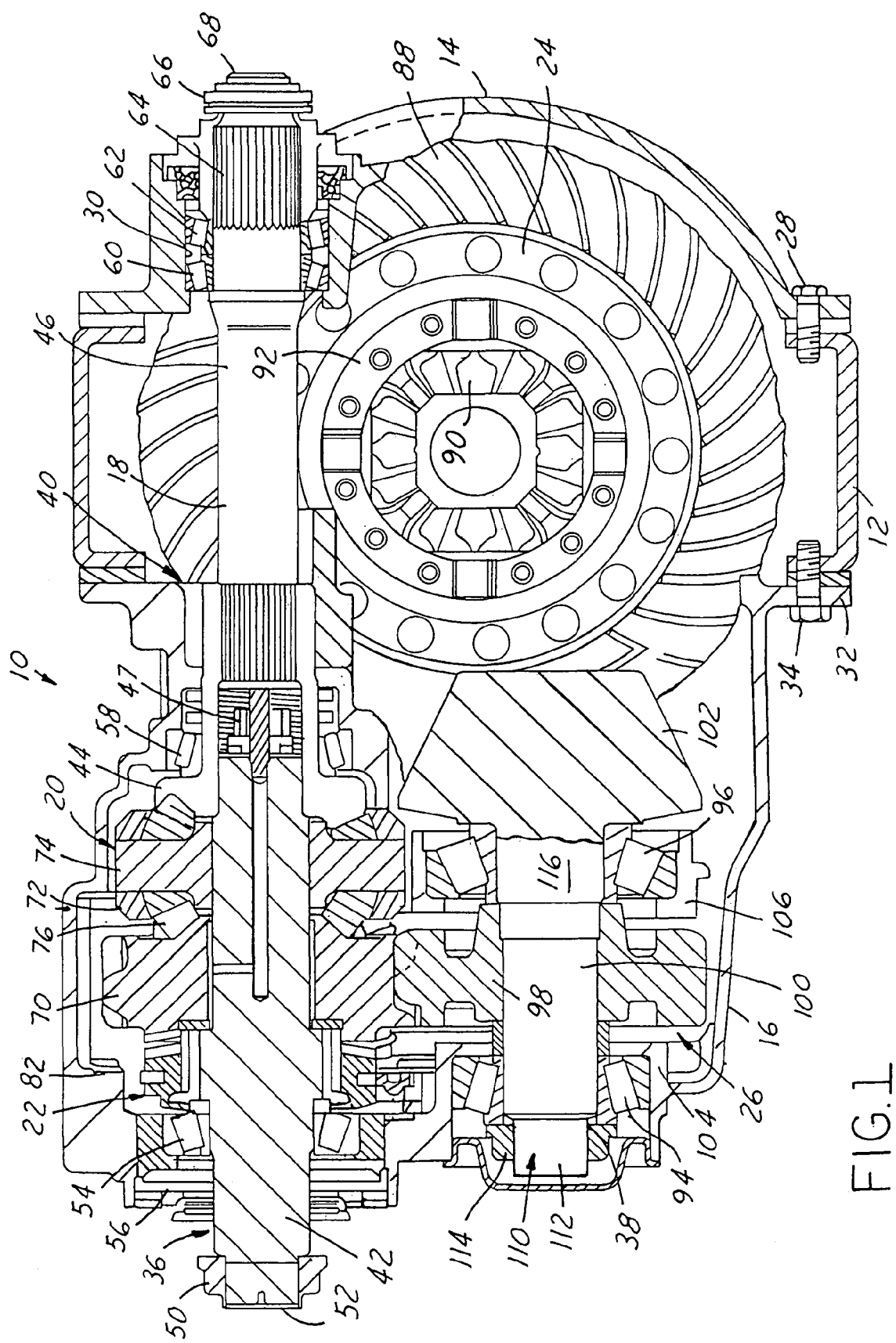
FIG. 1 is a cross-sectional view of a drive axle assembly assembled in accordance with the present invention.

Referring now to the drawings wherein like reference numerals are used to identify identical components in the various views, FIG. 1 illustrates a fully assembled drive axle assembly 10. Axle assembly 10 is particularly adapted for use in a tandem axle assembly for a heavy truck. It should be understood, however, that axle assembly 10 may find use in tandem axle assemblies found on a variety of conventional vehicles. Axle assembly 10 has a forward end (the left side in FIG. 1) and a rear end (the right side in FIG. 1) and may include the following elements: an axle housing 12; a rear housing 14; a differential carrier housing 16; a drive shaft assembly 18; means, such as an inter-axle differential 20, for dividing power between assembly 10 and another drive axle assembly (not shown) of the tandem axle assembly; a differential lock clutch 22; a differential gear assembly 24; and a pinion shaft subassembly 26.

Housings 12, 14, 16 provide structural support for the other components of assembly 10. Housings 12, 14, 16 also protect the other components of assembly 10 from foreign objects and elements. Housings 12, 14, 16 may be made from conventional metals and metal alloys such as steel.

Housings 12, 14 are configured to receive differential gear assembly 24 and may be coupled together using conventional fasteners 28 such as screws or bolts. Axle housing 12 defines a pair of openings (not shown) from which axle half shafts extend. The axle half shafts may support the vehicle wheels. Alternatively, the vehicle wheels may be supported directly on the axle housing. Rear housing 14 defines an opening 30 sized relative to components of drive shaft assembly 18 so as to allow drive shaft assembly 18 to pass therethrough.

Figure 2:
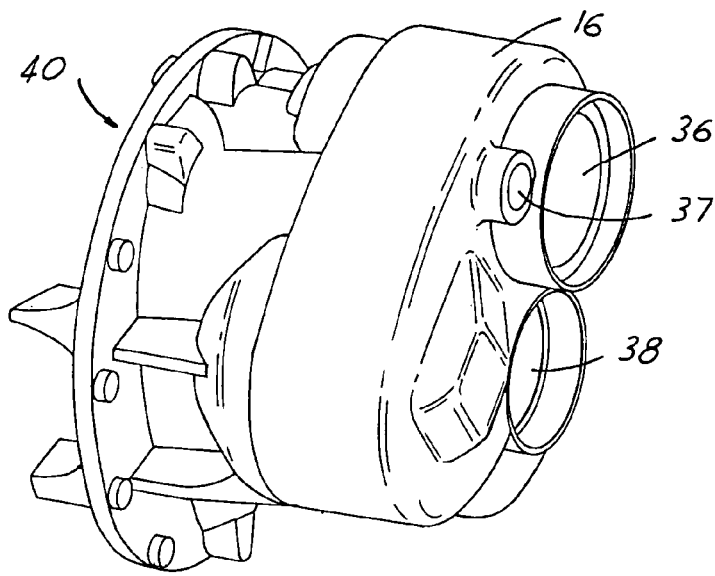
FIG. 2 is a perspective view of the differential carrier housing of the drive axle assembly of FIG. 1.

Carrier housing 16 is configured to house inter-axle differential 20 and pinion shaft subassembly 26 among other components of assembly 10. Carrier housing 16 has a body having forward and rearward ends and a radially extending flange 32 proximate the rearward end through which housing 16 may be coupled to housing 12 using conventional fasteners 34 such as screws or bolts. With reference to FIG. 2, in accordance with the present invention, carrier housing 16 is of unitary (i.e., one-piece) construction. The body of housing 16 includes several forward openings 36, 37, 38 at the forward end of the body and a rear opening 40 at the rearward end of the body. Forward openings 36, 37, 38 are relatively small in size and are sized relative to components of assembly 10 as described in greater detail hereinbelow.

Drive shaft assembly 18 is provided to transmit power from a power input shaft (not shown) at the forward end of drive axle assembly 10 to an intermediate drive shaft (not shown) disposed at the rear end of assembly 10 and extending between assembly 10 and another drive axle assembly. Drive shaft assembly 18 is conventional in the art and may include an input shaft 42, a gear 44, and an output shaft 46, as well as a pump 47.

Input shaft 42 is provided to transmit power from the power input shaft (not shown) to inter-axle differential 20 and is conventional in the art. Input shaft 42 is driven by the power input shaft through a conventional input yoke (not shown). The input yoke may be splined to the forward end of input shaft 42 on splines (not shown) and may be retained thereon by a nut 50 and a washer which are disposed about a threaded stud 52 that extends from shaft 42 and is integral therewith. Shaft 42 is journalled for rotation within housing 16 by bearings 54 which may comprise tapered roller bearings. The bearing cone for bearings 54 is disposed about shaft 42 while the bearing cup is supported within a threaded adjuster 56 having a plurality of threads that engage corresponding threads on housing 16 proximate opening 36. Opening 36 is therefore sized to receive only input shaft 42 and adjuster 56 and has a diameter about equal to the diameter of adjuster 56.

Figure 6:
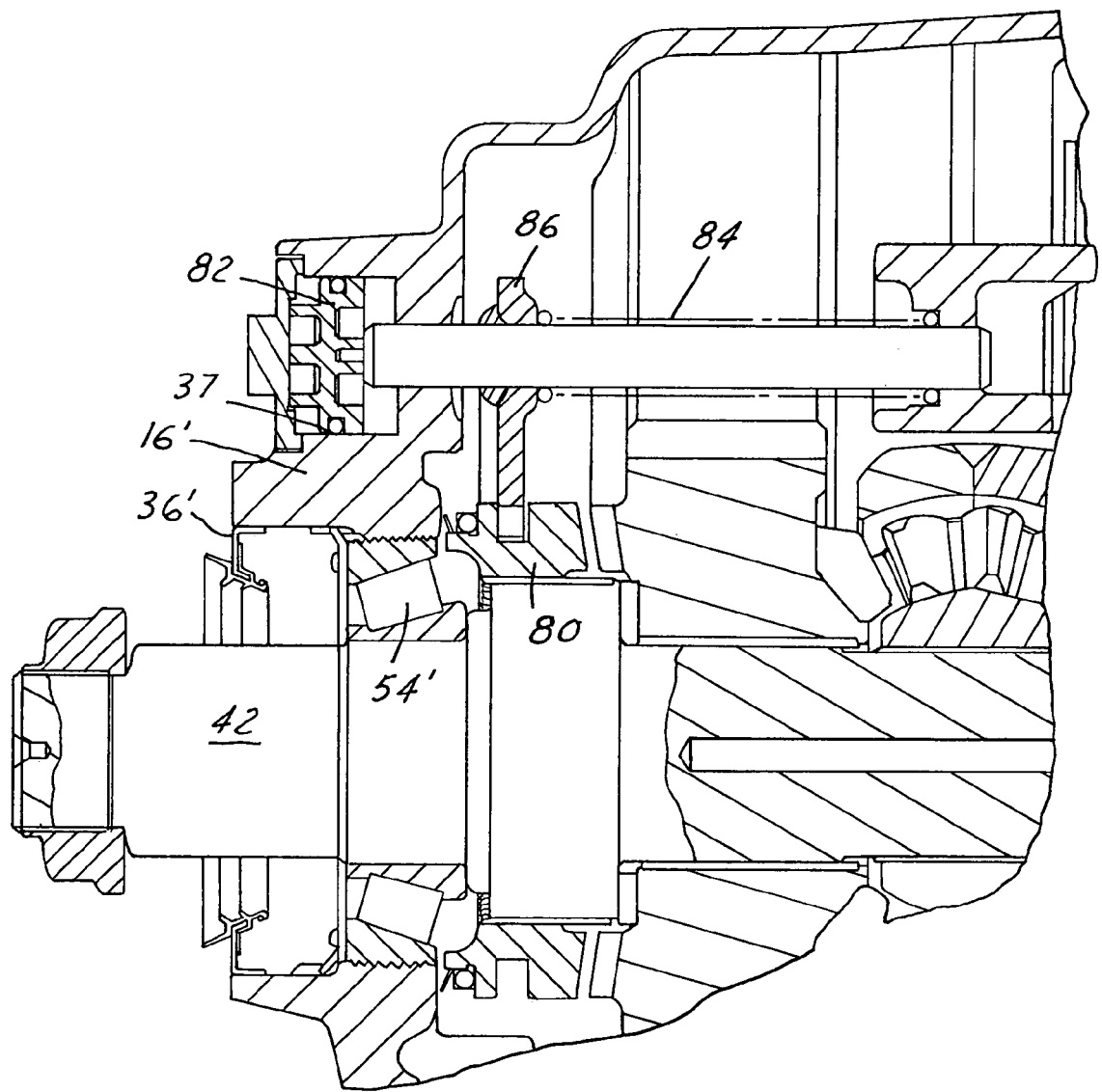
FIG. 6 is a cross-sectional view of a portion of a drive axle assembly assembled in accordance with the present invention.

In an alternate embodiment, illustrated in FIG. 6, adjuster 56 can be eliminated, and the bearing cup for bearings 54' may have a plurality of threads used to engage corresponding threads on housing 16' proximate to opening 36'. Opening 36' is, therefore, sized to receive only input shaft 42 and the bearing cone disposed on input shaft 42 and has a diameter about equal to the diameter of the bearing cone.

Gear 44 transmits power received from inter-axle differential 20 to output shaft 46. Gear 44 is conventional in the art and may be made from conventional metals and metal alloys. Gear 44 is disposed about shaft 46 near the forward end of shaft 46 and may be coupled thereto by mating splines (not shown) on gear 44 and shaft 46. Gear 44 is journalled for rotation within housing 16 by bearings 58.

Output shaft 46 is provided to transmit a portion of the power provided by input shaft 42 to the intermediate drive shaft (not shown) extending between assembly 10 and another drive axle assembly. Shaft 46 is coaxially disposed relative to input shaft 42, and extends through openings 40, 30 in housings 16, 14, respectively, and is journalled within opening 30 of housing 14 by bearings 60, 62. Shaft 46 transmits power to the intermediate drive shaft through a conventional output yoke (not shown). The output yoke may be splined to the rear end of output shaft 46 on splines 64 and may be retained thereon by a nut 66 and a washer which are disposed about a threaded stud 68 that extends from shaft 46 and is integral therewith.

Pump 47 is provided to lubricate components of inter-axle differential 20 during the differential action between input shaft 42 and output shaft 46. Pump 47 may have the structure set forth in co-pending and commonly assigned U.S. patent application Ser. No. 10/186,926.

Inter-axle differential 20 is provided to divide power between assembly 10 and another drive axle assembly and is conventional in the art. Differential 20 is made up, in part, by an input gear 70 and a power divider subassembly 72, which, in turn, may include a spider 74 and bevel gears 76.

Input gear 70 transfers torque from inter-axle differential 20 (and indirectly from input shaft 42 of drive shaft assembly 18) to pinion shaft subassembly 26. Gear 70 is also conventional in the art and may be made from conventional metals and metal alloys. Gear 70 is disposed about input shaft 42 and is freely rotatable thereon, being journalled on shaft 42 by bearings (not shown). Gear 70 includes a first set of teeth disposed on a rear planar surface that engage the teeth of bevel gears 76. Gear 70 further includes a second set of teeth disposed about the radial periphery of gear 70 for a purpose described hereinbelow.

Spider 74 provides a mounting arrangement for bevel gears 76 and is conventional in the art. Spider 74 may be coupled to input shaft 42 for rotation therewith using a spline connection or in other ways customary in the art.

Bevel gears 76 are provided to divide and transfer torque from input shaft 42 to input gear 70 (for driving pinion shaft subassembly 26 of drive axle assembly 10) and to gear 44 of drive shaft assembly 18 (for driving another drive axle assembly). Gears 76 are conventional in the art and may be made from conventional metals and metal alloys. Gears 76 are mounted on spider 74 for rotation with spider 74 and input shaft 42. The teeth on gears 76 engage corresponding teeth on gear 44 of drive shaft assembly 18 and on input gear 70.

Clutch 22 is provided to selectively lock inter-axle differential 20 and is conventional in the art. Referring to FIG. 6, clutch 22 comprises a conventional sliding dog clutch and includes a clutch member 80, a piston 82, a return spring 84, and a shift fork subassembly 86. Clutch 22 is engaged/disengaged by shifting a clutch member 80 with a first set of teeth into engagement/disengagement with a second set of teeth disposed on a forward side of input gear 70 using shift fork subassembly 86.

Differential gear assembly 24 is provided to enable the wheels (not shown) on opposite sides of drive axle assembly 10 to rotate at different speeds. Assembly 24 is conventional in the art and includes a ring gear 88 and a conventional bevel gear set 90 mounted within a differential carrier 92. Gear assembly 24 is substantially disposed within axle housing 12.

Pinion shaft subassembly 26 transfers torque from drive shaft assembly 18 to differential gear assembly 24. Subassembly 26 may include bearings 94, 96, a driven gear 98, a pinion shaft 100, and a pinion gear 102.

Bearings 94, 96 enable rotation of pinion shaft 100 relative to forward and rear pinion bearing support structures 104, 106 defined in carrier housing 16. Bearings 94, 96 are conventional in the art and may comprise tapered roller bearings. Bearings 94, 96 are disposed within coaxial openings in support structures 104, 106.

Driven gear 98 transmits torque from input gear 70 of inter-axle differential 20 to pinion shaft 100. Driven gear 98 may comprise a helical gear having teeth disposed about its radial periphery which engage corresponding teeth on input gear 70. Gear 98 may be drivingly coupled to shaft 100 through axially-extending splines (not shown) on shaft 100. Gear 98 may be disposed between support structures 104, 106 thereby allowing accurate positioning of gear 98.

Pinion shaft 100 transmits torque to pinion gear 102 and is conventional in the art. Shaft 100 is supported for rotation within housing 16 by bearings 94, 96. A first (or forward)

end 110 of shaft 100 may define an integral threaded shank 112 extending outwardly through forward opening 38 in housing 16 and configured to receive nut 114. A second (or rear) end 116 of shaft 100 is configured to receive pinion gear 102 thereon. Opening 38 in housing 16 may be sized relative to bearings 94 and nut 114 thereby preventing insertion of components larger than bearings 94 and nut 114 and therefore opening 38 may have a diameter about equal to the diameter of the bearing cup for bearings 94.

Pinion gear 102 transmits torque to ring gear 88 of differential gear assembly 24 and is also conventional in the art. Pinion gear 102 may comprise a hypoid gear and may be coupled to end 116 of shaft 100 using a spline connection or in other ways customary in the art. Pinion gear 102 is supported within assembly 10 solely by shaft 100.

Referring to FIGS. 1–5, a method in accordance with one embodiment of the present invention will now be set forth. A method in accordance with the present invention may begin with the step 120 of providing a differential carrier housing 16 having one or more forward openings 36, 37, 38, and a rear opening 40. In accordance with the present invention, housing 16 may be of a one-piece unitary construction.

The inventive method may continue with the step 122 of inserting driven gear 98, into housing 16 through rear opening 40. Step 122 may include the substep of locating gear 98 between forward and rear pinion bearing support structures 104, 106 defined in housing 16.

The inventive method may further continue with the step 124 of inserting pinion shaft 100 into carrier housing through opening 40. Step 124 may include the substep of coupling pinion shaft 100 and pinion gear 102 to form a pinion shaft subassembly. Alternatively gear 102 may be integral with shaft 100. Step 124 may also include the substep of inserting pinion shaft 100 through openings defined in the pinion bearing support structures 104, 106 and driven gear 98.

The inventive method may continue with the step 126 of inserting output gear 44 into housing 16 through rear opening 40. Step 126 may also include several substeps including the substep of locating gear 44 in a bearing cup defined or place in carrier housing 16.

The method may then continue with the step 128 of inserting power divider subassembly 72 into carrier housing 16 through rear opening 40. Referring to FIGS. 1 and 5, subassembly 72 may be located such that gear 44 is placed in mesh with gears 76 of subassembly 72 on a rearward side of subassembly 72.

Referring again to FIG. 3, the inventive method may continue with the step 130 of inserting input gear 70 into carrier housing 16 through rear opening 40. Referring again to FIGS. 1 and 5, gear 70 may be located such that gear 70 is placed in mesh with gears 76 of subassembly 72 on a forward side of subassembly 72.

Referring again to FIGS. 3 and 6, the inventive method may further include the steps 132, 134 of inserting clutch member 80 and shift fork 86 into carrier housing 16 through rear opening 40. Other clutch components, such as piston 82 and spring 84, may be inserted through forward opening 37 in housing 16. The size of opening 37 may be limited to a size such that it is only large enough to allow insertion of piston 82 and spring 84 and not any components that are greater in size than piston 82 and spring 84. Accordingly, opening 37 may have a diameter about equal to a diameter of piston 82. Referring to FIGS. 1 and 5, member 80 may be located such that a plurality of teeth on one side of member 80 may selectively engage another set of teeth formed on a forward side of input gear 70. It should be understood, however, that the location of components of clutch 22 may be varied without departing from the spirit of the present invention.

Figure 3:
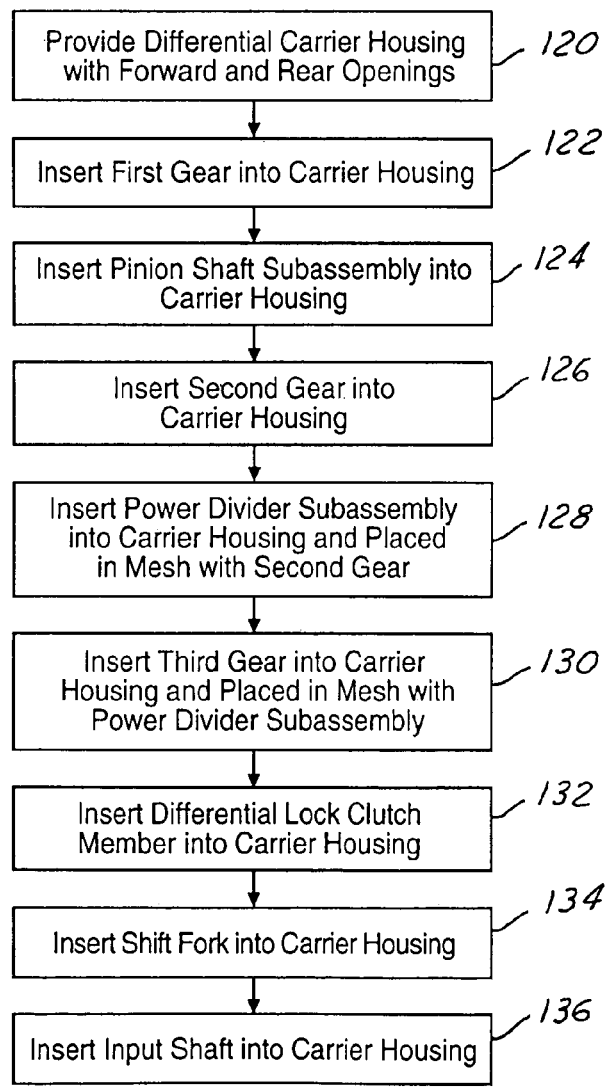
FIG. 3 is a flow chart representing a method of assembling a drive axle assembly in accordance with one embodiment of the present invention.

Referring to FIG. 3, the inventive method may further include the step 136 of inserting input shaft 42 into carrier housing 16 through forward opening 36. Referring to FIGS. 1 and 5, input shaft 42 may have a forward bearing cone disposed about input shaft 42 prior to insertion, and may be inserted through input gear 70, spider 74, clutch 80, and output gear 44, and be coupled to spider 74 for rotation therewith in a conventional manner. After inserting input shaft 42, adjuster 56 may be inserted into opening 36 and rotated to apply the proper bearing pre-load or end play to bearings 54. Referring to FIG. 6, in an alternate embodiment of the invention, after inserting input shaft 42, the threaded bearing cup of bearing 54' may be inserted into opening 36' of carrier housing 16' and be rotated to apply the proper bearing pre-load or end play to bearing 54'.

In the embodiment of the inventive method illustrated in FIG. 3, steps 120 to 136 are performed sequentially. It should be understood, however, that the order of steps could be varied in a number of ways without departing from the spirit of the present invention.

This inventive method represents an improvement as compared to conventional methods of assembling drive axle assemblies. Because most of the internal components of axle assembly 10 are installed from the rear end of housing 16 as opposed to the forward end of housing 16, housing 16 may be may be unitary in construction and other access points and cover pieces may be eliminated. As a result, the potential for joint failure and lubricant leakage is reduced and the weight and cost of assembly 10 may also be reduced.

While the invention has been particularly shown and described with reference to the preferred embodiments thereof, it is well understood by those skilled in the art that various changes and modifications can be made in the invention without departing from the spirit and scope of the invention.

I claim:

1. A differential carrier housing, comprising:
    a body having a first forward opening at a forward end of said body and a rear opening at a rearward end of said body, said body configured to receive an input shaft, a power divider subassembly, a pinion shaft subassembly, and a differential clutch, said body further including a second forward opening configured to allow insertion of bearings supporting one end of a pinion shaft of said pinion shaft subassembly, said second forward opening having a diameter about equal to a diameter of a bearing cup of said bearing, said body still further including a third forward opening configured to allow insertion of a piston associated with said differential clutch, said third forward opening having a diameter about equal to a diameter of said piston;
    a radially extending flange extending from said body proximate said rearward end of said body and configured for connection to an axle housing; and
    wherein said rear opening is configured to allow insertion of said power divider subassembly and said pinion shaft subassembly into said body and said first forward opening is configured to allow insertion of said input shaft and a bearing cone disposed about said input shaft, said first forward opening having a diameter about equal to one of a diameter of said bearing cone and a diameter of a bearing adjuster.

2. The differential carrier housing of claim 1 wherein said differential carrier housing is of a one-piece construction.

3. The differential carrier housing of claim 1 wherein said body is configured to receive a shift fork subassembly.

4. The differential carrier housing of claim 3 wherein said rear opening in said body is configured to allow insertion of said shift fork subassembly into said body.

5. The differential carrier housing of claim 1 wherein said body is configured to receive a first gear.

6. The differential carrier housing of claim 5 wherein said rear opening in said body is configured to allow insertion of said first gear into said body.

7. The differential carrier housing of claim 5 wherein said first gear is rotatably coupled to said pinion shaft.

8. The differential carrier housing of claim 5 wherein said first gear is disposed between forward and rear pinion bearing support structures defined in said carrier housing.

9. The differential carrier housing of claim 1 wherein said body is configured to receive a second gear.

10. The differential carrier housing of claim 9 wherein said rear opening in said body is configured to allow insertion of said second gear into said body.

11. The differential carrier housing of claim 10 wherein said power divider subassembly includes a plurality of differential gears and said second gear is in mesh with said plurality of gears on a rearward side of said power divider subassembly.

12. The differential carrier housing of claim 1 wherein said body is configured to receive a third gear.

13. The differential carrier housing of claim 12 wherein said rear opening in said body is configured to allow insertion of said third gear into said body.

14. The differential carrier housing of claim 13 wherein said power divider subassembly includes a plurality of differential gears and said third gear is in mesh with said plurality of gears on a forward side of said power divider subassembly.

* * * * *